(12) United States Patent
Toma et al.

(10) Patent No.: US 7,983,010 B2
(45) Date of Patent: Jul. 19, 2011

(54) PERPENDICULAR MAGNETIC RECORDING HEAD AND PERPENDICULAR MAGNETIC RECORDING/REPRODUCING HEAD WITH AT LEAST ONE SHIELD LAYER HAVING A SUBSTANTIALLY ARCHED PORTION

(75) Inventors: Yusuke Toma, Niigata-ken (JP); Hiroshi Kameda, Niigata-ken (JP); Kiyoshi Kobayashi, Niigata-ken (JP); Toru Takahashi, Niigata-ken (JP); Sumihito Morita, Niigata-ken (JP)

(73) Assignee: TDK Corporation, Tokyo (JP)

( * ) Notice: Subject to any disclaimer, the term of this patent is extended or adjusted under 35 U.S.C. 154(b) by 1032 days.

(21) Appl. No.: 11/780,608

(22) Filed: Jul. 20, 2007

(65) Prior Publication Data

US 2008/0019043 A1 Jan. 24, 2008

(30) Foreign Application Priority Data

Jul. 21, 2006 (JP) ................. 2006-199727
Oct. 30, 2006 (JP) ................. 2006-293435

(51) Int. Cl.
*G11B 5/39* (2006.01)
*G11B 5/147* (2006.01)

(52) U.S. Cl. ............... 360/319; 360/317; 360/125.2; 360/125.21

(58) Field of Classification Search ............ 360/125.16, 360/125.2, 125.21, 317, 319
See application file for complete search history.

(56) References Cited

U.S. PATENT DOCUMENTS

| | | | | |
|---|---|---|---|---|
| 6,275,360 | B1 * | 8/2001 | Nakamoto et al. | 360/319 |
| 7,436,628 | B2 * | 10/2008 | Kameda et al. | 360/125.1 |
| 7,656,620 | B2 * | 2/2010 | Nishiyama et al. | 360/319 |
| 7,667,928 | B2 * | 2/2010 | Hirabayashi et al. | 360/125.21 |
| 7,742,259 | B2 * | 6/2010 | Kameda et al. | 360/125.01 |
| 2005/0083608 | A1 | 4/2005 | Watanabe | |
| 2005/0219764 | A1 * | 10/2005 | Kameda et al. | 360/313 |
| 2006/0256472 | A1 | 11/2006 | Hirabayashi et al. | |
| 2008/0174911 | A1 * | 7/2008 | Toma et al. | 360/125.19 |
| 2008/0212238 | A1 * | 9/2008 | Watanabe et al. | 360/319 |

FOREIGN PATENT DOCUMENTS

| | | |
|---|---|---|
| JP | 2006-199727 | 8/2006 |
| JP | 2006-293435 | 10/2006 |
| JP | 2006-318579 | 11/2006 |

OTHER PUBLICATIONS

Search Report for IDS for our case 06-00743.
Notification of Reason for Rejection for Japanese Patent Application 2006-199727, dispatched May 7, 2008, 2 pages.

* cited by examiner

*Primary Examiner* — Jefferson Evans
(74) *Attorney, Agent, or Firm* — Hunton & Williams, LLP

(57) ABSTRACT

A perpendicular magnetic recording head according to the present invention is composed of a first magnetic layer having a main magnetic pole exposed at a facing surface opposite a recording medium, a second magnetic layer adjacent to the first magnetic layer with an intermediary non-magnetic layer disposed therebetween, and a coil layer for applying a recording magnetic field to the first magnetic layer. Since the second magnetic layer has a shape including a substantially arched portion in its cross section along a height direction, it becomes possible to keep an Edge Write magnetic field in a low level and improve external magnetic field resistance.

4 Claims, 14 Drawing Sheets

MEDIUM-FACING SURFACE

LONGITUDINAL DIRECTION

MEDIUM-FACING SURFACE

HEIGHT DIRECTION

LONGITUDINAL DIRECTION

TRACK WIDTH DIRECTION

MEDIUM-FACING SURFACE

PERPENDICULAR MAGNETIC RECORDING HEAD AND PERPENDICULAR MAGNETIC RECORDING/REPRODUCING HEAD WITH AT LEAST ONE SHIELD LAYER HAVING A SUBSTANTIALLY ARCHED PORTION

CLAIM OF PRIORITY

This application claims benefit of the Japanese Patent Application No. 2006-199727 filed on Jul. 21, 2006, and the Japanese Patent Application No. 2006-293435 filed on Oct. 30, 2006, which are hereby incorporated by reference.

BACKGROUND OF THE INVENTION

1. Field of the Invention

The present invention relates to a perpendicular magnetic recording head and a perpendicular magnetic recording/reproducing head, which records by applying a magnetic field in a direction perpendicular to the medium surface of a recording medium.

2. Description of the Related Art

A perpendicular magnetic recording head has a laminated structure in its facing surface opposite a recording medium, the laminated structure being composed by providing a return yoke layer on a main magnetic pole layer with an intermediary non-magnetic insulation layer disposed therebetween. The main magnetic pole layer and return yoke layer are magnetically connected to each other at a back position of the medium-facing surface in a height direction. In the non-magnetic insulation layer there is embedded a coil layer for applying a recording magnetic field to the main magnetic pole layer and return yoke layer. In a magnetic recording head having such a structure, a recording magnetic field is induced between the main magnetic pole layer and return yoke layer by applying electric power to the coil layer, and the recording magnetic field is perpendicularly incident from the medium-facing surface of the main magnetic pole layer to the hard film of a recording medium and returns to the return yoke layer after passing through the soft film of the recording medium. In this manner, data recording is carried out in the area of a recording medium facing to the main magnetic pole layer (see United States Patent Application Publication No. US20050083608 A1).

In addition to the above, a perpendicular magnetic recording/reproducing head has a reading portion including a lower shield layer formed on a non-magnetic insulation layer provided on a slider and an upper shield layer formed on the lower shield layer with an intermediary inorganic insulation layer (gap insulation layer) disposed therebetween, the inorganic insulation layer having a reading element therein.

A return yoke layer and shield layers of a perpendicular magnetic recording head are generally composed of a thin magnetic body film having a substantially rectangular shape, and when an external magnetic field is applied, magnetic flux in the thin magnetic body film concentrates on an edge thereof. At that time, among magnetization components, the component in a height direction becomes largest, which causes overwriting of existing data (Edge Write). That is, it is necessary to make magnetic field components in the height direction smaller to suppress the Edge Write magnetic field, the magnetic field components being generated from each edge of the return yoke layer and shield layers.

SUMMARY OF THE INVENTION

Exemplary embodiments of the present invention provide a perpendicular magnetic recording head or a perpendicular magnetic recording/reproducing head with which it becomes possible to keep an Edge Write magnetic field in a low level and improve external magnetic field resistance.

A perpendicular magnetic recording head according to embodiments of the present invention is composed of a first magnetic layer having a main magnetic pole exposed at a facing surface opposite a recording medium, a second magnetic layer adjacent to the first magnetic layer with an intermediary non-magnetic layer disposed therebetween, and a coil layer for applying a recording magnetic field to the first magnetic layer; wherein the second magnetic layer has a shape including a substantially arched portion in its cross section along a height direction.

According to this configuration, the second magnetic layer has a shape including a substantially arched portion in its cross section along a height direction. In the substantially arched portion, since an external magnetic field is applied in a direction along an axis not easily magnetized, the magnetic body is not easily magnetized and the generated magnetic field becomes smaller. Accordingly, even if a return yoke layer is relatively thinner, it is possible to keep an Edge Write magnetic field in a low level and improve external magnetic field resistance.

In a perpendicular magnetic recording head according to embodiments of the present invention, the substantially arched portion may be located so as to be exposed at the facing surface, or that the substantially arched portion is disposed at a position recessed from the facing surface.

A perpendicular magnetic recording/reproducing head according to embodiments of the present invention is composed of a reading element exposed at a facing surface opposite a recording medium, a pair of shield layers for shielding the reading element, a magnetic layer having a main magnetic pole exposed at a facing surface opposite the recording medium, a return yoke layer provided on the magnetic layer with an intermediary non-magnetic layer disposed therebetween, and a coil layer for applying a recording magnetic field to the magnetic layer and the return yoke layer; wherein at least one of the shield layers among the pair of the shield layers has a shape including a substantially arched portion in its cross section along a height direction. According to this configuration, the shield layer has a shape including a substantially arched portion in its cross section along a height direction.

In the substantially arched portion, since an external magnetic field is applied in a direction along an axis not easily magnetized, the magnetic body is not easily magnetized and the generated magnetic field becomes smaller. Accordingly, even if the return yoke layer is relatively thinner, it is possible to keep an Edge Write magnetic field in a low level and improve external magnetic field resistance.

In a perpendicular magnetic recording/reproducing head according to embodiments of the present invention, each of the pair of the shield layers may have a shape including a substantially arched portion in its cross section along a height direction, each of the substantially arched portions being formed so as to protrude from the insulation layer.

In a perpendicular magnetic recording/reproducing head according to embodiments of the present invention, the substantially arched portion may be located so as to be exposed at the facing surface, or that the substantially arched portion is disposed at a position recessed from the facing surface.

A perpendicular magnetic recording head according to embodiments of the present invention enable an Edge Write magnetic field to be kept in a low level and external magnetic field resistance to be improved, since being composed of a first magnetic layer having a main magnetic pole exposed at a facing surface opposite a recording medium, a second magnetic layer adjacent to the first magnetic layer with an intermediary non-magnetic layer disposed therebetween, and a coil layer for applying a recording magnetic field to the first magnetic layer and wherein the second magnetic layer has a shape including a substantially arched portion in its cross section along a height direction.

A perpendicular magnetic recording/reproducing head according to embodiments of the present invention also enable an Edge Write magnetic field to be kept in a low level and external magnetic field resistance to be improved, since being composed of a reading element exposed at a facing surface opposite a recording medium, a pair of shield layers for shielding the reading element, a magnetic layer having a main magnetic pole exposed at a facing surface opposite the recording medium, a return yoke layer provided on the magnetic layer with an intermediary non-magnetic layer disposed therebetween, and a coil layer for applying a recording magnetic field to the magnetic layer and the return yoke layer, and wherein at least one of the shield layers among the pair of the shield layers has a shape including a substantially arched portion in its cross section along a height direction.

DESCRIPTION OF THE EXEMPLARY EMBODIMENTS

Exemplary embodiments are discussed in detail below. While specific exemplary embodiments are discussed, it should be understood that this is done for illustration purposes only. A person skilled in the relevant art will recognize that other components and configuration can be used without departing from the spirit and scope of the claimed inventions.

Exemplary embodiments of the present invention will now be described in detail with reference to the attached drawings. In a perpendicular magnetic recording head, when its internal temperature rises during data recording, such a phenomenon, so called PTP (Pole Tip Protrusion), that a return yoke layer is apt to protrude from its medium-facing surface occurs due to a difference in thermal expansion coefficients between the material composing the return yoke layer and insulating materials surrounding the return yoke layer and the like.

This PTP phenomenon could be suppressed by making the return yoke layer thinner. However, if the return yoke layer is made uniformly thinner to suppress the PTP phenomenon and the area of the return yoke layer exposed at the medium-facing surface becomes smaller, the return yoke layer may become apt to be magnetized in the height direction and the strength of the magnetic field component generated in the height direction becomes increased, which causes occurrence of Edge Write. For this reason, the Edge Write magnetic field may be kept in a low level and external magnetic field resistance may be improved to suppress the PTP phenomenon.

That is, exemplary embodiments of the present invention provide a perpendicular magnetic recording head is provided with a first magnetic layer having a main magnetic pole exposed at a facing surface opposite a recording medium, a second magnetic layer adjacent to the first magnetic layer with an intermediary non-magnetic layer disposed therebetween, and a coil layer for applying a magnetic field to the first magnetic layer. The second magnetic layer may have a shape including a substantially arched portion in its cross-section along a height direction, and owing to such a configuration, it is expected to keep the Edge Write magnetic field in a low level and improve external magnetic field resistance, as well as to suppress the PTP phenomenon.

Figure 1:
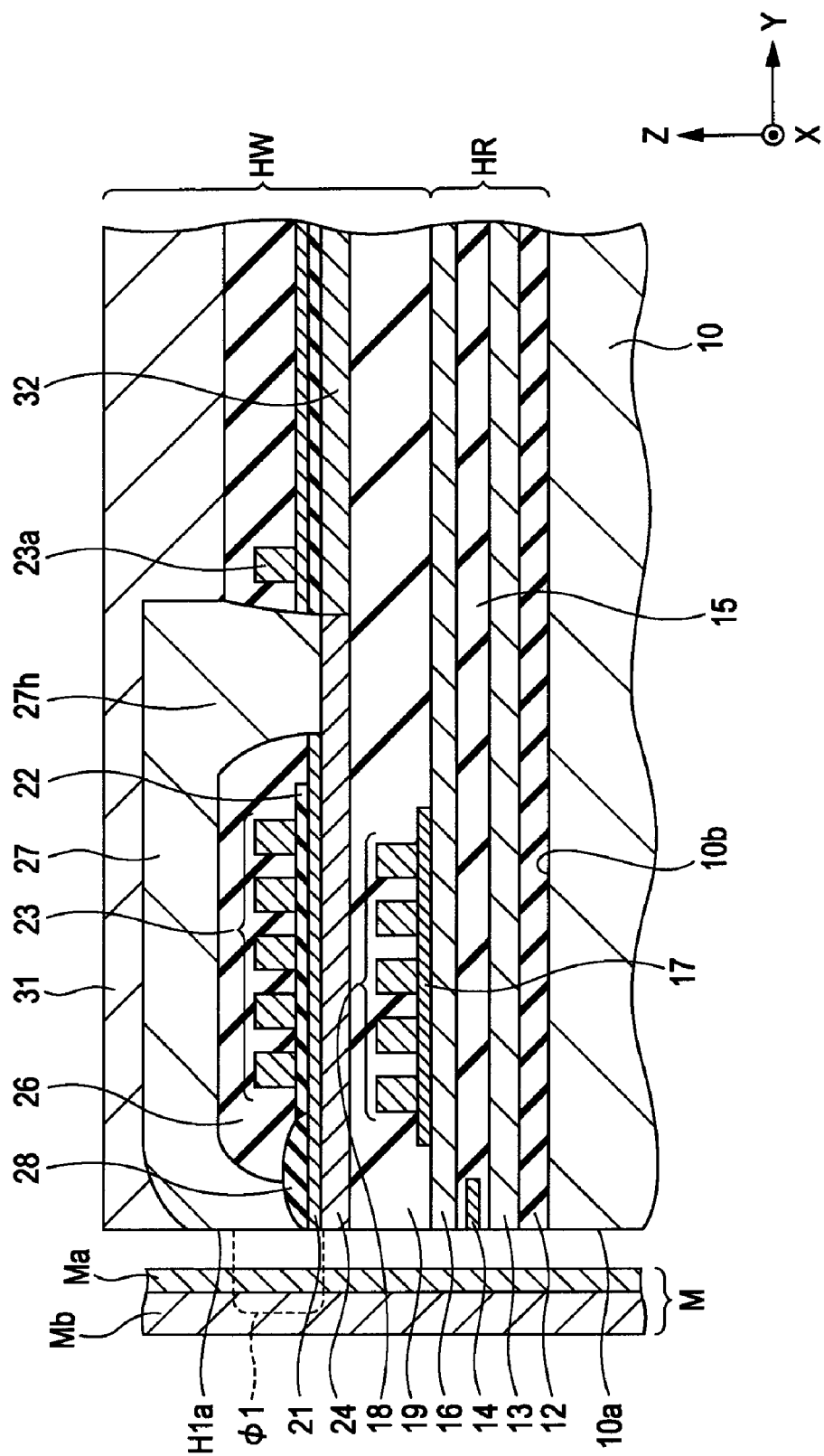
FIG. 1 is a longitudinal cross-sectional view of a magnetic head having a perpendicular magnetic recording head according to an embodiment of the present invention.
Figure 2:
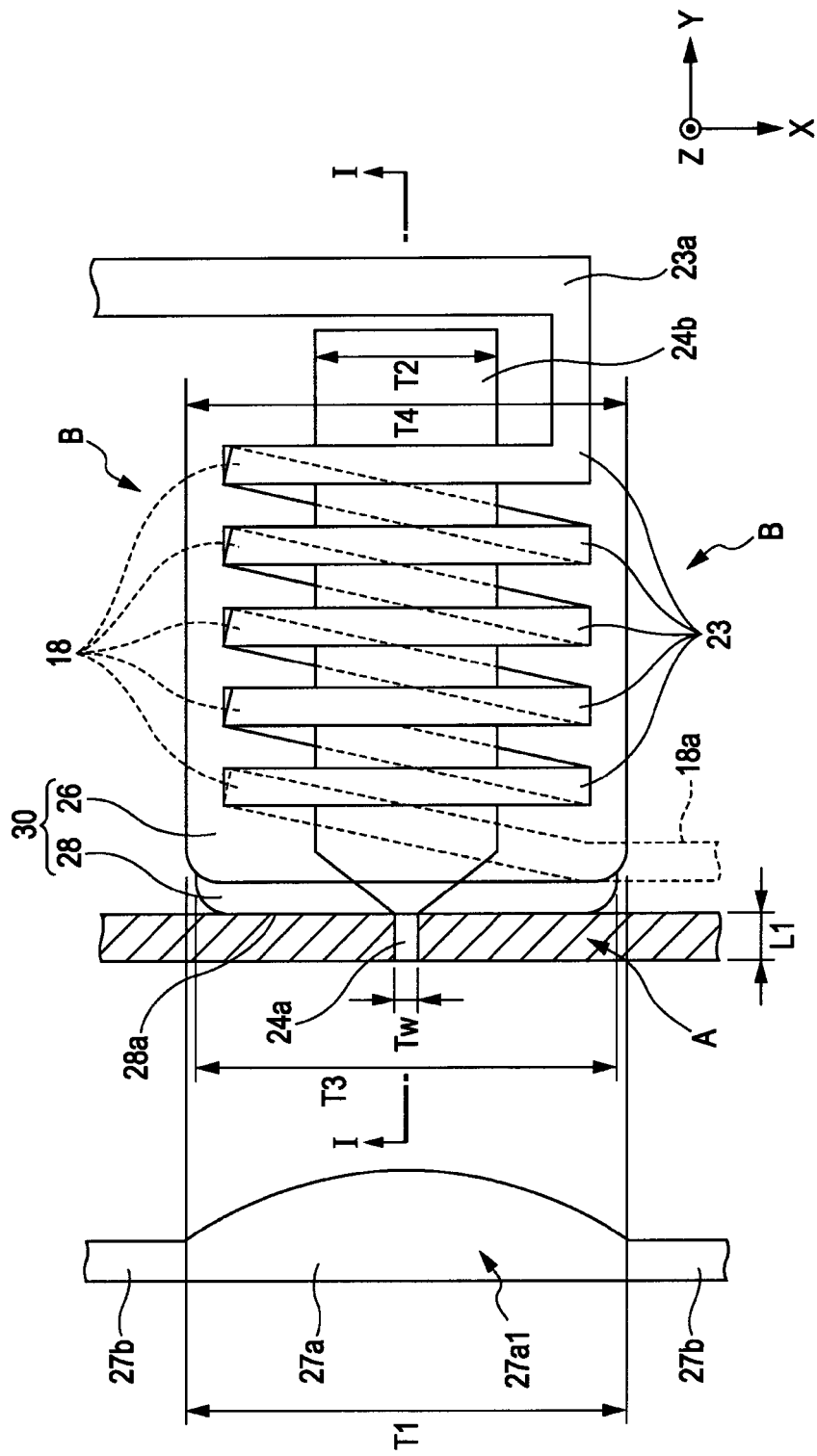
FIG. 2 is a partial plan view of the perpendicular magnetic recording head shown in FIG. 1, and a partial elevation view of a return yoke layer.

FIG. 1 is a longitudinal cross-sectional view of a perpendicular magnetic recording head according to an exemplary embodiment of the present invention. In such an embodiments, the second magnetic layer is a return yoke layer. FIG. 2 is a partial plan view of the perpendicular magnetic recording head shown in FIG. 1, and a partial elevation view of the return yoke layer. In FIG. 1, X denotes the track width direction, Y denotes the height direction and Z denotes the film thickness direction; each direction is perpendicular to the other two directions.

The perpendicular magnetic recording head HW shown in FIG. 1 applies a perpendicular magnetic field onto a recording medium M and magnetizes the hard film Ma of the recording medium M in the perpendicular direction. The recording medium M has, for example, a disk-like shape and is configured so as to have a hard film Ma having high residual magnetization on its surface and a soft film Mb having high magnetic transmittance inside the hard film Ma, and to rotate around the center of the disk.

A slider 10 is constituted of a non-magnetic material such as $Al_2O_3$—TiC. The facing face 10a of the slider 10 is opposed to the recording medium M, and the slider 10 floats on the surface of the recording medium M due to air flow over the surface as the recording medium M rotates, or the slider 10 slides on the recording medium M. On the trailing-side end face (top face) 10b of the slider 10, there is formed a non-magnetic insulation layer 12 constituted of an inorganic material such as $Al_2O_3$, $SiO_2$, or the like, and a reading portion HR is formed on the non-magnetic insulation layer 12.

The reading portion HR includes a lower shield layer 13 formed on the non-magnetic insulation layer 12 and an upper shield layer 16 formed on the lower shield layer 13 with an intermediary inorganic insulation layer (gap insulation layer) 15 disposed therebetween. A reading element 14 is provided in the inorganic insulation layer 15. As the reading element 14, there is used a magnetoresistance effect element such as an AMR (Anisotropic MagnetoResistance) element, GMR (Giant MagnetoResistance) element, TMR (Tunnel MagnetoResistance) element, or the like.

On the upper shield layer 16, a plurality of lower coil pieces 18 constituted of a conductive material with an intermediary coil insulation substrate layer 17 disposed therebetween are formed. The lower coil pieces 18 are composed of at least a kind of metal material selected from, for example, Au, Ag, Pt, Cu, Cr, Al, Ti, NiP, Mo, Pd, Rh and Ni. The lower layer coil pieces 18 may be formed by laminating layers composed of these non-magnetic metal materials.

Around the lower coil pieces 18, a coil insulation layer 19 composed of an inorganic insulation material such as $Al_2O_3$ or an organic insulation material such as a resist. The top face of the coil insulation layer 19 is made flattened; on this top face a plating ground layer (not shown) is formed, and on the plating ground layer a main magnetic pole layer 24 is formed. The surroundings of the main magnetic pole layer 24 are filled with an insulation layer 32 composed of $Al_2O_3$, $SiO_2$, or the like, and the respective top faces of the main magnetic pole layer 24 and insulation layer 32 are flattened so as to be in substantially the same plane. The main magnetic pole layer 24 is composed of a ferromagnetic material having high saturated magnetic flux density, for example, such as NiFe, CoFe, NiFeCo, or the like, and is formed, for example, by means of plating.

As shown in FIG. 2, the main magnetic pole layer 24 has a slim front portion 24a that is formed from the facing face H1a opposed to the recording medium (the facing surface H1a is formed in substantially the same plane as the facing surface 10a of the slider 10) along a height direction (Y-direction in the attached figure) with a track width Tw, and a rear portion 24b that is formed behind the front portion 24a in the height direction with a width wider than that of the front portion 24a (the maximum width dimension is T2) in the track width direction (X-direction in the attached figure).

As shown in FIG. 1, a gap layer 21 is formed on the main magnetic pole layer 24, the gap layer 21 being a non-magnetic layer composed of an inorganic material such as $Al_2O_3$, $SiO_2$, or the like. On the gap layer 21, upper coil pieces 23 with an intermediary coil insulation substrate layer 22 disposed therebetween are formed. The coil insulation substrate layer 22 is not necessarily formed, since the gap layer 21 functions also as an insulation substrate. The upper coil pieces 23 are constituted in a plurality of conductive material pieces, as with the lower coil pieces 18, and composed of at least a kind of metal material selected from, for example, Au, Ag, Pt, Cu, Cr, Al, Ti, NiP, Mo, Pd, Rh and Ni. The upper coil pieces 23 may be formed by laminating layers composed of these non-magnetic metal materials.

The lower coil pieces 18 and upper coil pieces 23 are disposed in a solenoidal configuration respectively as shown in FIG. 2, and the end portions of the respective coil pieces in the track width direction (X-direction in the attached figure) are electrically connected each other. The lower coil pieces 18 and upper coil pieces 23 are provided with leader portions 18a and 18b respectively; through the leader portions 18a and 18b, electrical current is supplied to the solenoidal coils.

On the upper coil pieces 23, a coil insulation layer 26 composed of an inorganic insulation material such as $Al_2O_3$, or an organic insulation material such as a resist is formed. Moreover, in this embodiment, a space-adjustment insulation layer 28 is formed on the gap layer 21. The space-adjustment insulation layer 28 may be composed of an inorganic material or organic material. The front edge of the coil insulation layer 26 is overlapped on the space-adjustment insulation layer 28. As shown in FIG. 2, the front edge 28a of the space-adjustment insulation layer 28 is linearly extended along a direction substantially parallel to the track width direction (X-direction in the attached figure). The front edge 28a of the space-adjustment insulation layer 28 is formed to be spaced apart from the facing surface H1a by a predetermined distance (gap depth) L1 in the height direction. The space-adjustment insulation layer 28 is extended for a long distance along the track width direction (X-direction in the attached figure) as shown in FIG. 2. The width dimension T3 of the front edge 28a of the space-adjustment insulation layer 28 is made bigger than at least the maximum width dimension T2 of the main magnetic pole layer 24.

In the case of using a solenoidal coil, the width dimension of the upper coil pieces 23 in the track width direction is bigger than the maximum width dimension T2 of the main magnetic pole layer 24, so the maximum width dimension T4 of the coil insulation layer 26 covering the upper coil pieces 23 necessarily becomes bigger than the maximum width dimension T2 of the main magnetic pole layer 24. The space-adjustment insulation layer 28 is composed of, for example, an organic insulation material and formed by thermal curing. Due to the thermal curing, the longitudinal cross-sectional shape of the space-adjustment insulation layer 28 becomes deformed from a rectangular-like shape to a semi-oval shape (or a shape at least with a curved top surface 28b). The coil insulation layer 26, which is formed so as to have a portion overlapping on the space-adjustment insulation layer 28 and to be extended along the height direction, is also composed of an organic insulation material and formed by thermal curing. The top surface 26b on the facing surface side of the coil insulation layer 26 is formed so as to be projected in a curved shape from the top face 28b of the space-adjustment insulation layer 28. When the top face of the gap layer 21 is a reference plane, the space-adjustment insulation layer 28 and coil insulation layer 26 (hereinafter, these two layers are occasionally called as "insulation layer 30") are formed so as to be projected upward (in the Z-direction in the attached figure) from the reference plane. In the surroundings of the insulation layer 30, the top face of the gap layer 20 is exposed. Hereinafter, the area between the front edge 28a of the space-adjustment insulation layer 28 and the facing surface H1a is denoted as a front area A (diagonally shaded area in FIG. 3), and the both side areas of the insulation layer 30 in the track width direction (X-direction in the attached figure) are denoted as both side areas B.

As shown in FIGS. 1 and 2, a return yoke layer 27 is formed on the front area A, the insulation layer 30, and the both side areas B, the return yoke layer 27 being a second magnetic layer composed of a magnetic material such as Parmalloy. The rear end portion of the return yoke layer 27 in the height direction is a connection portion 227h that is magnetically connected to the main magnetic pole layer 24 as shown in FIG. 1. The return yoke layer 27 is covered with a protection layer 31 composed of an inorganic insulation material or the like. The second magnetic layer may be a layer not having connection portion 27h, i.e., not being magnetically connected to a magnetic layer including a main magnetic pole, the layer merely having a shielding function.

The return yoke layer 27 is constituted of a center portion 27a and both side edge portions 27b which are positioned at both sides of the center portion 27a in the track width direction (X-direction in the attached figure). The center portion 27a is formed at a position opposed to the main magnetic pole layer 24 in the film thickness direction (Z-direction in the attached figure). As shown in FIGS. 1 and 2, the center portion 27a has a projected portion 27a1 formed to be projected in an upward direction on the area covering from the insulation layer 30 to the front area A. The return yoke layer 27 formed on the insulation layer 30 is configured to be projected upward compared to the return yoke layer 27 formed on the both side areas B, since the insulation layer 30 is formed in the first place to be projected more than the both side areas B. At that time, the film thickness of the return yoke layer 27 formed on the insulation layer 30 is not much different with that of the return yoke layer 27 formed on the both side areas B. Incidentally, the thickness of the return yoke layer 27 is approximately from 0.1 μm to 1.0 μm in consideration of suppressing the PTP phenomenon.

Figure 3:
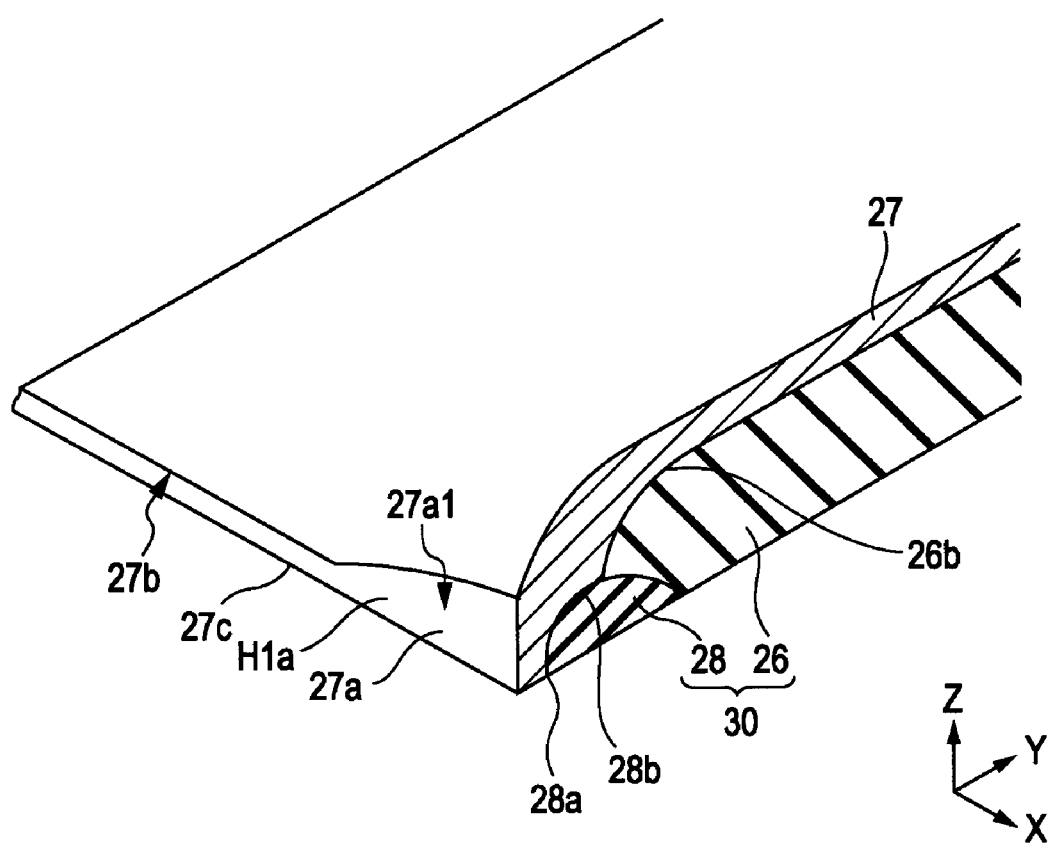
FIG. 3 is a partial elevation view of the perpendicular magnetic recording head shown in FIG. 1 as seen from a facing surface opposite a recording medium.

Since the top surface of the front area A is flattened as described above, as shown in FIG. 3, the undersurface of the return yoke layer 27 formed on the front area A is configured to be a flattened plane, and at the facing surface H1a, the underside edge 27c of the return yoke layer 27 appears as a straight line in a direction parallel to the track width direction (X-direction in the attached figure). The return yoke layer 27 is also formed so that its plane shape is substantially a rectangle, as shown in FIG. 3, the width dimension T4 of the return yoke layer 27 in the track width direction, which appears at the facing surface H1a, is made bigger enough than the track width Tw of the main magnetic pole layer 24.

Figure 4A:
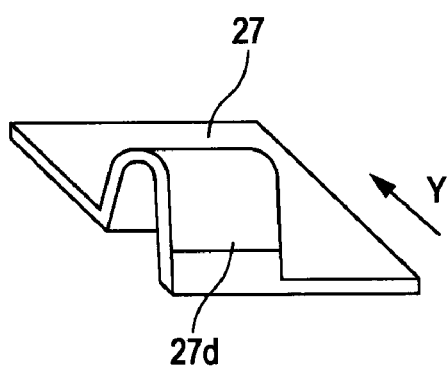
FIGS. 4A and 4B are schematic views for illustrating the shape of the return yoke layer.
Figure 4B:
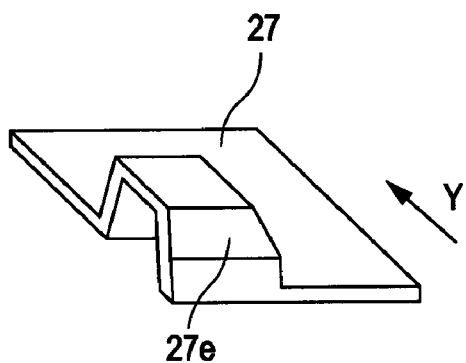
Figure 5A:
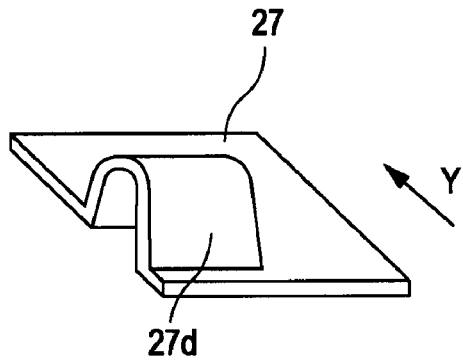
FIGS. 5A and 5B are schematic views for illustrating the shape of the return yoke layer.
Figure 5B:
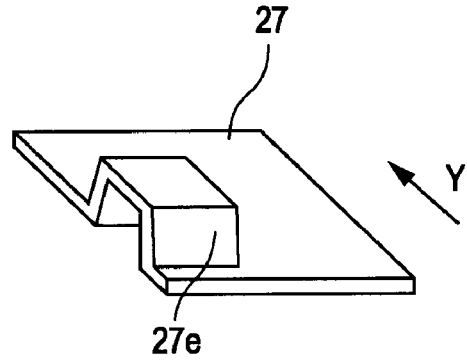

The return yoke layer 27 has a shape including a substantially arched portion in the cross section along the height direction (Y-direction), the arched portion including ones configured as shown in FIGS. 4A, 4B, 5A, 5B and 6A to 6C. Among such arched portions, there are included, for example, substantially semi-circular arched portions 27d in the cross section along the height direction (Y-direction) as shown in FIGS. 4A and 5A, and substantially trapezoidal arched portions 27e in the cross section along the height direction (Y-direction) as shown in FIGS. 4B and 5B. The arched portion in the return yoke layer 27 can be located at any position in the cross section along the height direction (Y-direction); it may be located so as to be exposed at the medium-facing surface as shown in FIGS. 4A and 4B, or located at a position recessed from the medium-facing surface as shown in FIGS. 5A and 5B.

Figure 6A:
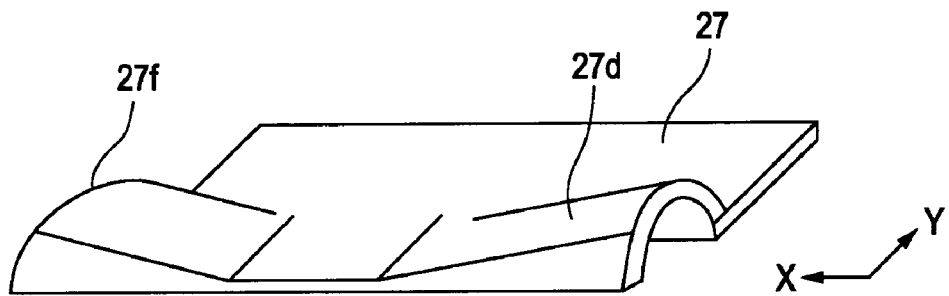
FIGS. 6A to 6C are schematic views for illustrating the shape of the return yoke layer.
Figure 6B:
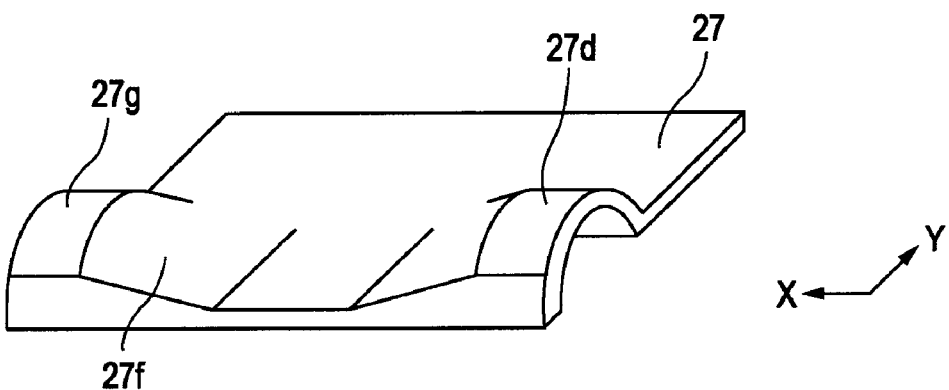
Figure 6C:
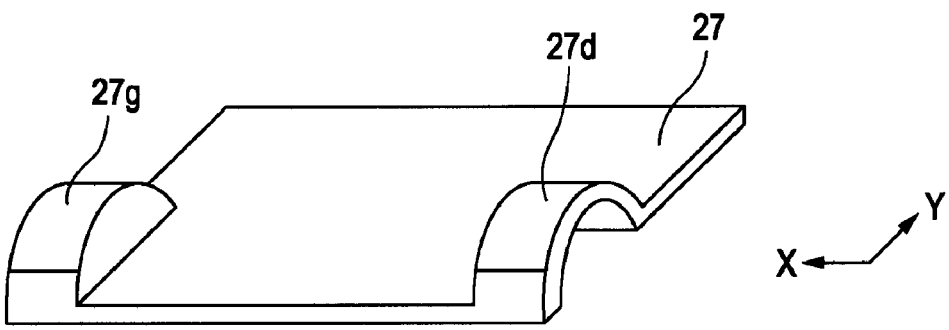

The arched portion 27d can be configured to have a tapered surface 27f declined toward the center in the track width direction (X-direction) as shown in FIG. 6A, to have a plane surface 27g and the tapered surface 27f as shown in FIG. 6B, or to have the plane surface 27g but not the tapered surface 27f as shown in FIG. 6C. Although the case of the substantially semi-circular arched portion 27d is herein described, the substantially trapezoidal arched portion 27e and the other arched portions are also configured in a like manner.

A demagnetizing field of the return yoke layer, which is a thin magnetic film, enables keeping an Edge Write magnetic field in a low level and improves external magnetic field resistance with use of a demagnetizing field of the return yoke layer having a substantially arched portion.

The demagnetizing field (Hd) is a magnetic field that is generated by a magnetic pole in a direction opposite the magnetizing direction in a magnetic body, concurrently when the magnetic body being magnetized. In general, demagnetizing field coefficients have the following relationship in an orthogonal coordinate system:

$$Nx+Ny+Nz=1$$

Figure 7A:
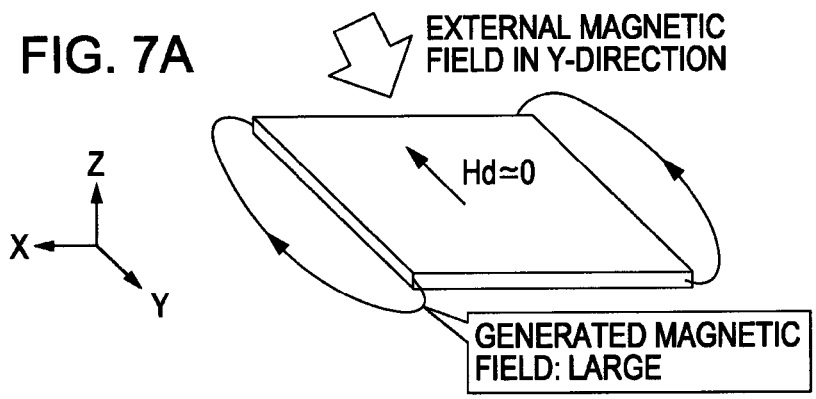
FIGS. 7A to 7D are schematic views for illustrating generating magnetic fields.
Figure 7B:
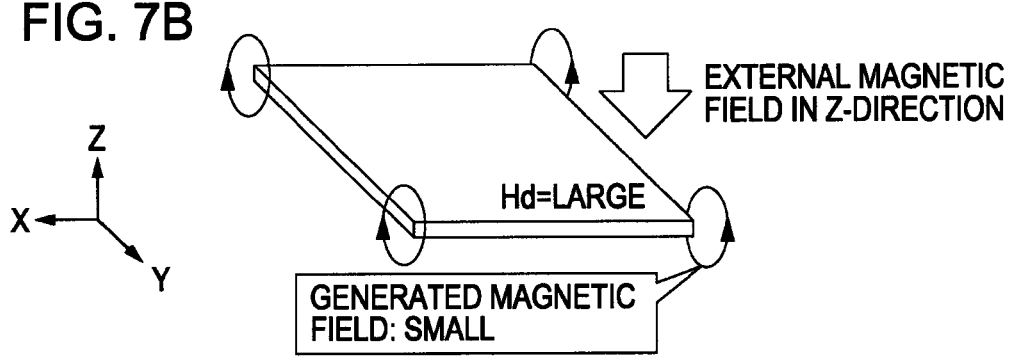

When a magnetic body is a thin film having a thickness of approximately zero, the demagnetizing field coefficients of the magnetic body can be considered so that Nx and Ny are zero and Nz is 1. Now, it is taken into account that an external magnetic field is applied to such a magnetic body. When an external magnetic field is applied in the direction along an axis easily magnetized, as shown in FIG. 7A, it is thought that the magnetic body is easily magnetized and the generated magnetic field becomes larger; on the other hand, when an external magnetic field is applied in the direction along an axis not easily magnetized, as shown in FIG. 7B, it is thought that the magnetic body is not easily magnetized and the generated magnetic field becomes smaller.

Figure 7C:
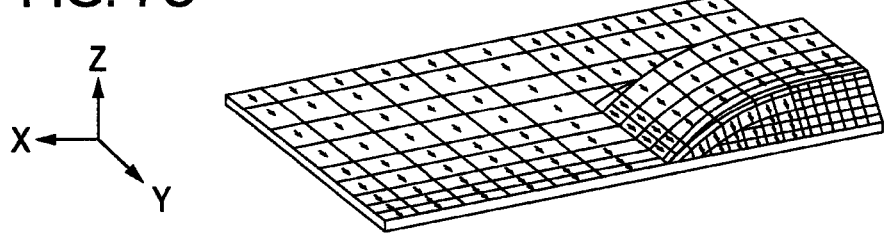
Figure 7D:
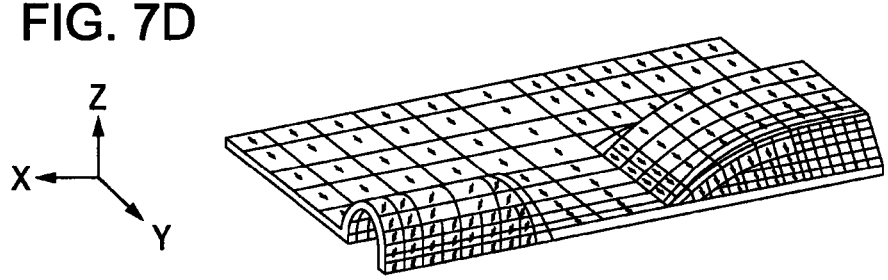

If this way of thinking is applied to the return yoke layer 27 of a perpendicular magnetic recording head, since the return yoke layer 27 is a thin film, magnetization of the magnetic body concentrates toward the edge of the thin film when being applied with an external magnetic field as shown in FIG. 7C. For this reason, a substantially arched portion is provided for the return yoke layer so as to have a direction not easily magnetized in the thin film magnetic body. As shown in FIG. 7D, the magnetic field component in the height direction is thereby reduced and the Edge Write magnetic field becomes being kept in a low level, by which the external magnetic field resistance is improved. From this point of view, the cross sectional shape of the arched portion in a height direction (Y-direction) is not limited, as long as the shape allows a direction not easily magnetized to exist in the thin film magnetic body.

Next, a manufacturing method of a perpendicular magnetic recording head having such a return yoke layer will be described. FIGS. 8A to 8D are schematic views for illustrating a manufacturing method for a perpendicular magnetic recording head according to the present invention; wherein, the FIGS. 8A to 8D are views from the medium-facing surface and the FIGS. 8B to 8D also show the cross sectional views taken along the line C-C.

Figure 8A:
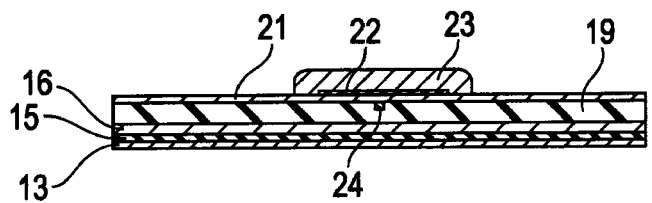
FIGS. 8A to 8D are schematic views for illustrating a manufacturing method for a perpendicular magnetic recording head according to embodiments of the present invention.
Figure 8B:
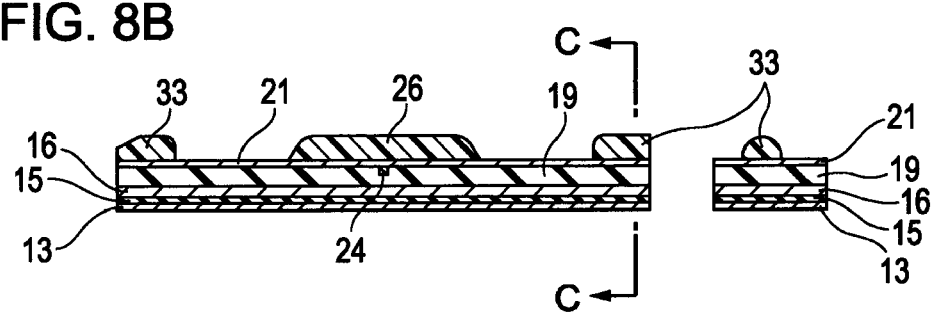

The structure shown in FIG. 8A is composed in a manner such that a non-magnetic insulation layer 12, a lower shield layer 13, an inorganic insulation layer 15, and an upper shield layer 16 are formed on a slider 10; an insulation layer 19 including a main magnetic pole layer 24 is formed on the upper shield layer 16; a gap layer 21 is formed on the insulation layer 19; a coil insulation substrate layer 22 having been patterned is formed; and an upper coil pieces 23 are formed on the coil insulation substrate layer 22. Incidentally, the normally used conditions, material, and the like are adoptable for manufacturing the structure shown in FIG. 8A.

As the next step, on the coil insulation substrate layer 22 and the gap layer 21 including the upper coil pieces 23, a resist layer 26, which is a coil insulation layer is formed. This resist layer 26 covers the coil insulation substrate layer 22 and the upper coil pieces 23. A resist layer 33 provided for forming arched portions is formed together with the resist layer 26 or separately from the resist layer 26. That is, the resist layers are provided on the coil insulation substrate layer 22 and the upper coil piece 23, and also on the area where the arched portions are formed. Specifically, the resist layer 33 is formed in a manner such that the coil insulation substrate layer 22 and the gap layer 21 including the upper coil pieces 23 are covered with a resist material, exposed to light through a mask having an opening at the area where the resist is formed, and further developed. The cross-sectional shape of the arched portion in the height direction can be changed by changing post-bake conditions for the resist layer 33. For example, a substantially semi-circular cross-sectional shape can be obtained with a relatively higher post-bake temperature, or a substantially trapezoidal cross-sectional shape can be obtained by a relatively lower post-bake temperature.

Figure 8C:
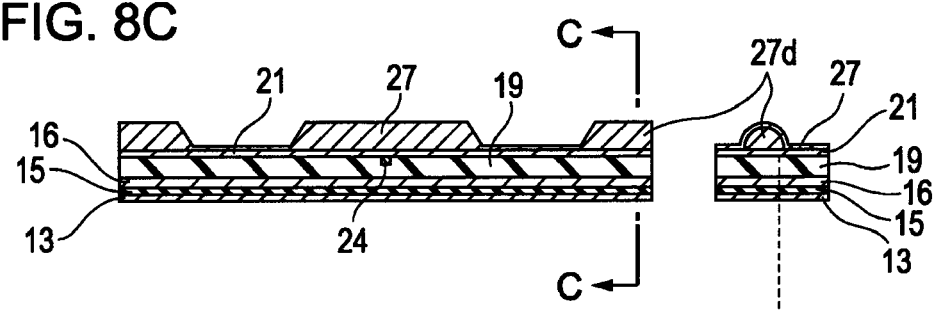
Figure 8D:
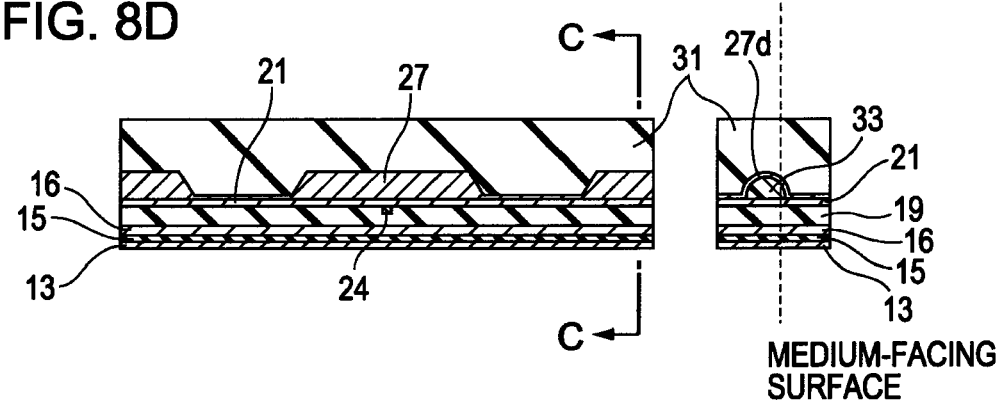

As a further step, a return yoke layer 27 is formed on the resist layer 33 as shown in FIG. 8C. In this case, the return yoke layer 27 is formed by applying plating onto the resist layer 33. This return yoke layer 27 is formed according to the shape of the resist layer 33 in the area where the arched portions are formed, since being formed on the resist layer 33 in the area. That is, the return yoke layer 27 including arched portions can be formed. And then an insulation layer 31 is formed on the return yoke layer 27 as shown in FIG. 8D.

In this manner, a perpendicular magnetic recording head having a return yoke layer 27 including arched portions can be manufactured. This perpendicular magnetic recording head has arched portions that are exposed at the medium-facing surface as known from the cross-sectional view taken along the line C-C in FIG. 8B. The arched portion has a state such that an external magnetic field is applied in the direction along an axis not easily magnetized; therefore the magnetic body is not easily magnetized and the generated magnetic field is small. Accordingly, even if the return yoke layer 27 is relatively thinner, it becomes possible to keep the Edge Write magnetic field in a low level and improve the external magnetic field resistance.

Although substantially semi-circular arched portions located so as to be exposed at the medium-facing surface are illustrated in FIGS. 8A to 8D, substantially trapezoidal arched portions exert similar effects and an arched portion located at a position recessed from the medium-facing surface also exerts similar effects. Furthermore, the positioning of an arched portion at a position recessed from the medium-facing surface enables to suppress the protrusion of the arched portion (PTP) from the medium-facing surface.

Figure 9:
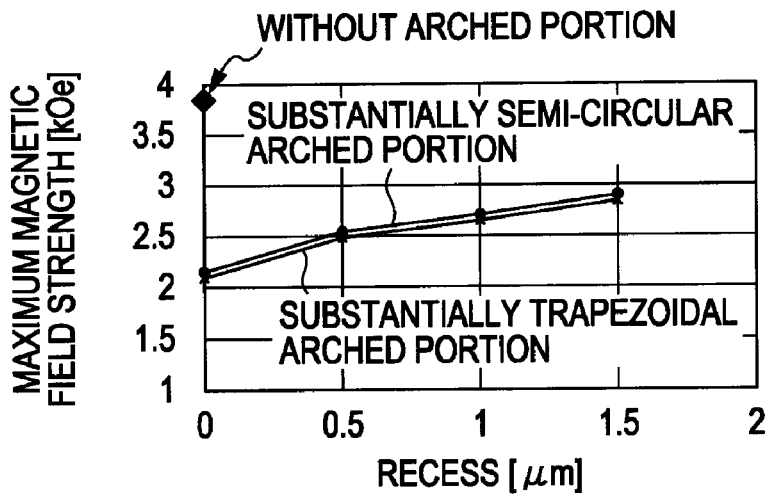
FIG. 9 is a diagram showing characteristics of a perpendicular magnetic recording head according to an embodiment of the present invention.

An exemplary embodiment performed for verifying the effects of the present invention will now be described. In this embodiment, the effects were verified by means of a static magnetic field simulation; wherein the portion of a perpendicular magnetic recording head related with external magnetic field resistance was modeled, and the magnetization status thereof when being applied with an external magnetic field was calculated. Incidentally, the maximum value among the magnetic field component distribution in a height direction, which is generated from the return yoke layer, was taken as the maximum magnetic field strength. The magnetic field component distribution in the height direction was measured at a plane surface positioned in the center of film thickness of the recording magnetic film. The maximum magnetic field strength obtained was that of a magnetic head equipped with a perpendicular magnetic recording head having a return yoke layer including a substantially semi-circular arched portion in a cross section along its height direction, the return yoke layer having its thickness of 0.5 µm. The results are shown in FIG. 9. Furthermore, the maximum magnetic field strength was also measured in each case when the position of the arched portion in the return yoke layer of the magnetic recording head was changed (recess: 0 µm (medium-facing surface), 0.5 µm, 1 µm, 1.5 µm). The results are also shown in FIG. 9.

The maximum magnetic field strength also obtained as with the above case was for a magnetic head equipped with a perpendicular magnetic recording head having a return yoke layer including a substantially trapezoidal arched portion in a cross-section along a height direction, the return yoke layer having its thickness of 0.5 µm. The results are also shown in FIG. 9. Furthermore, the maximum magnetic field strength was also measured in each case when the position of the arched portion in the return yoke layer of the magnetic recording head was changed (recess: 0 µm (medium-facing surface), 0.5 µm, 1 µm, 1.5 µm). The results are also shown in FIG. 9.

For the purpose of comparison, the maximum magnetic field strength of a magnetic head equipped with a perpendicular magnetic recording head including a return yoke layer not having an arched portion, the return yoke layer having its thickness of 0.5 µm, was. The results are also shown in FIG. 9.

As known from the FIG. 9, the magnetic field strength of the magnetic head equipped with a perpendicular magnetic recording head according to embodiments of the present invention was 3 kOe ($\times 10^3/4\pi$ A/m) or less regardless of the recess distance; namely, the external magnetic field resistance is improved. On the other hand, the magnetic field strength of the magnetic head equipped with a perpendicular magnetic recording head having a return yoke layer without an arched portion was close to 4 kOe ($\times 10^3/4\pi$ A/m); consequently, Edge Write may arise depending on the coercive force of a recorded medium.

Figure 10A:
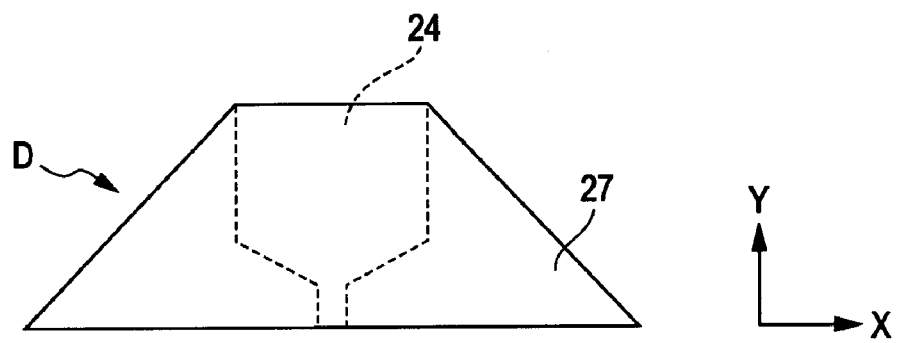
FIGS. 10A and 10B are schematic views showing other examples of the return yoke layer of a perpendicular magnetic recording head according to an embodiment of the present invention.
Figure 10B:
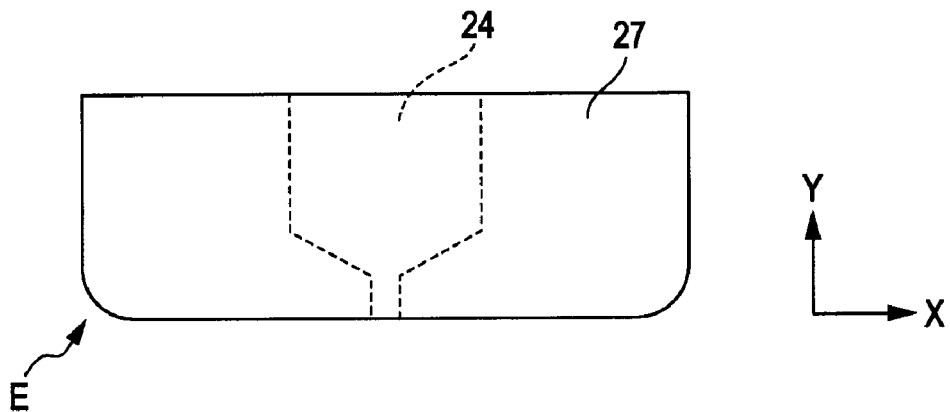

According to embodiments of the present invention, a perpendicular magnetic recording head can be modified in various ways. The shape of a return yoke layer at its rear edge side (a position recessed from its medium-facing surface) may be modified, for example, in a way such that the rear edge side is formed to have tapered surfaces D and the width becomes narrow toward its rear end as shown in FIG. 10A. Or, as shown in FIG. 10B, there may be provided curved surfaces E or the like on the medium-facing surface side of a return yoke layer so that the width becomes wider toward its rear end. In these embodiments, it is also possible to keep an Edge Write magnetic field in a low level and improve external magnetic field resistance.

In a perpendicular magnetic recording/reproducing head, when its internal temperature rises during data recording, such a phenomenon, so called PTP (Pole Tip Protrusion), that a shield layer is apt to protrude from its medium-facing surface occurs due to a difference in thermal expansion coefficients between the material composing the shield layer and insulating materials surrounding the shield layer and the like.

The PTP phenomenon may be suppressed by making the shield layer thinner. However, if the shield layer is made uniformly thinner to suppress the PTP phenomenon and the area of the shield layer at the medium-facing surface becomes smaller, there is a fear that the shield layer becomes apt to be magnetized in a height direction and the strength of the magnetic field component generated in the height direction becomes increased, which causes occurrence of Edge Write.

For this reason, the Edge Write magnetic field may be kept in a low level and external magnetic field resistance may be improved to suppress the PTP phenomenon.

A perpendicular magnetic recording/reproducing head is provided with a magnetic layer having a main magnetic pole at a facing surface opposite a recording medium, a return yoke layer provided on the magnetic layer with an intermediary non-magnetic layer disposed therebetween, and a coil layer for applying a magnetic field to the magnetic layer and the return yoke layer, and a pair of shield layers that sandwich an insulation layer having a reading element at the facing surface opposite a recording medium, at least one of the shield layers among the pair of shield layers having a shape including a substantially arched portion in its cross-section along a height direction, and owing to such a configuration, it is expected to keep the Edge Write magnetic field in a low level and improve external magnetic field resistance, as well as to suppress the PTP phenomenon.

FIG. 1 is a longitudinal cross-sectional view of a magnetic head having a perpendicular magnetic recording/reproducing head according to an embodiment of the present invention. FIG. 2 is a partial plan view of the perpendicular magnetic recording/reproducing head shown in FIG. 1, and a partial elevation view of a return yoke layer. In FIG. 1, X denotes the track width direction, Y denotes the height direction and Z denotes the film thickness direction; each direction is perpendicular to the other two directions. Explanations of FIGS. 1 and 2 are omitted, since being the same as described above.

Figure 11A:
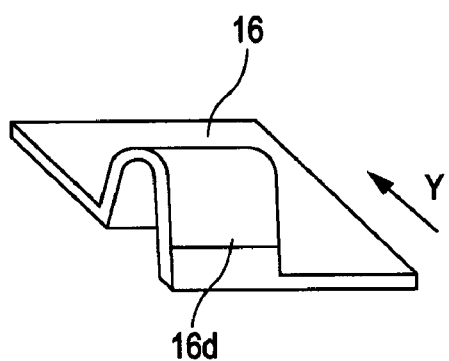
FIGS. 11A and 11B are schematic views for illustrating the shape of a shield layer according to an embodiment of the present invention.
Figure 11B:
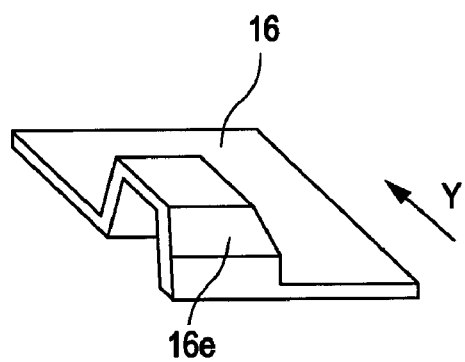
Figure 12A:
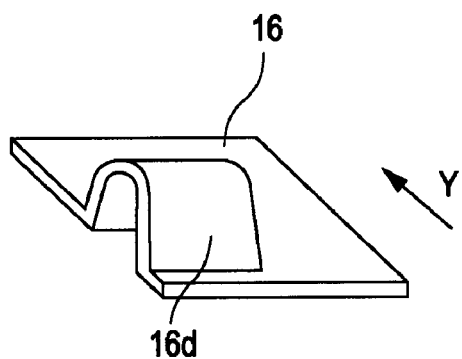
FIGS. 12A and 12B are schematic views for illustrating the shape of the shield layer according to an embodiment of the present invention.
Figure 12B:
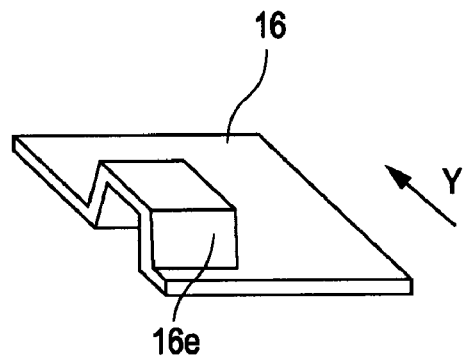

The lower shield layer 13 and upper shield layer 16 respectively have a shape including a substantially arched portion in the cross section along the height direction (Y-direction), the arched portion including ones configured as shown in FIGS. 11A, 11B, 12A, 12B, and 13A to 13C. The details about the upper shield layer 16 are described herein, and the lower shield layer can be configured in a like manner. Among such arched portions, there is included, for example, a substantially semi-circular arched portion 16d in the cross section along the height direction (Y-direction) as shown in FIGS. 11A and 12A, and a substantially trapezoidal arched portion 16e in the cross section along the height direction (Y-direction) as shown in FIGS. 11B and 12B. The arched portion in the upper shield layer 16 can be located at any position in the cross section along the height direction (Y-direction. For example, the arched portion may be located so as to be exposed at the medium-facing surface as shown in FIGS. 11A and 11B, or located at a position recessed from the medium-facing surface as shown in FIGS. 12A and 12B.

Figure 13A:
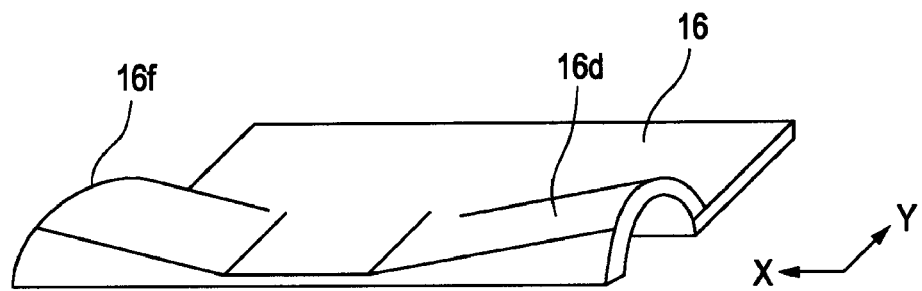
FIGS. 13A to 13C are schematic views for illustrating the shape of the shield layer according to an embodiment of the present invention.
Figure 13B:
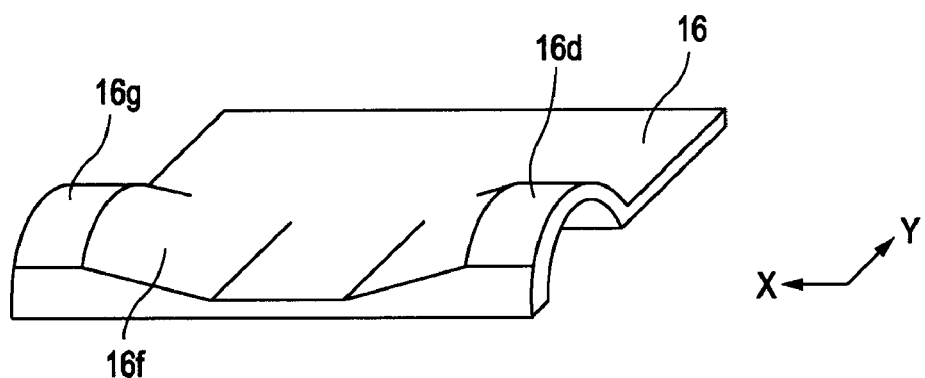
Figure 13C:
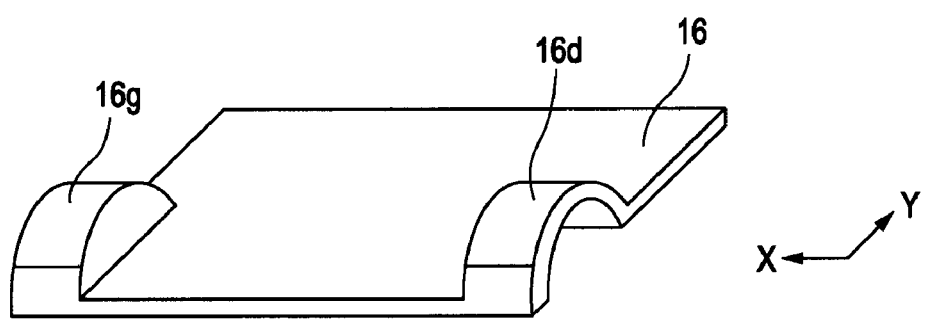

The arched portion 16d can be configured to have a tapered surface 16f declined toward the center in the track width direction (X-direction) as shown in FIG. 13A, to have a plane surface 16g and the tapered surface 16f joined together as shown in FIG. 13B, or to have the plane surface 16g but not the tapered surface 16f as shown in FIG. 13C. Although the case of the substantially semi-circular arched portion 16d is described herein, the substantially trapezoidal arched portion 16e and the other arched portions are also configured in a like manner.

In the embodiments of the present invention, such a shield layer having an arched portion shaped as described above is employed as the pair of shield layers, i.e., the upper shield layer 16 and/or lower shield layer 13 that shield a reading element 14 disposed at the facing surface opposite a recording medium. This embodiment described herein relates to CIP (Current In Plane) type in which the reading element 14 feeds a current in parallel with a film surface. That is, the inorganic insulation layer 15 having the reading element 14 is sandwiched by the pair of shield layers, which may also be applicable to CPP (Current Perpendicular to Plane) type in which the reading element 14 feeds a current in perpendicular to a film surface. That is, the shield layer also enabled to be used as a current lead layer is adjacent to the reading element 14.

Figure 14A:
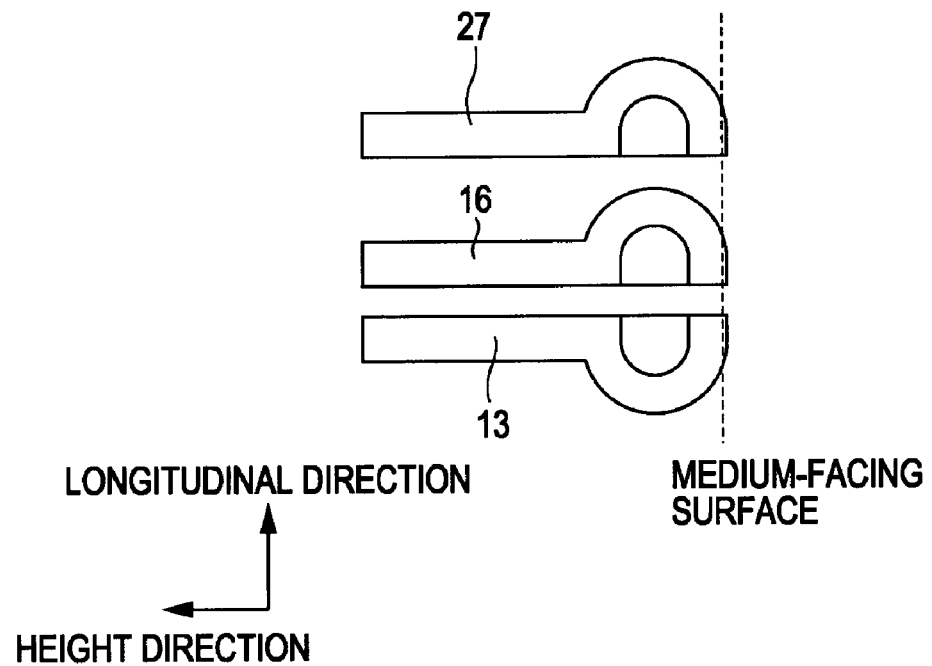
FIGS. 14A and 14B are schematic views showing configurations of the upper shield layer, lower shield layer and return yoke layer respectively having arched portions according to an embodiment of the present invention.

In these embodiments, when each of the pair of shield layers has a shape including a substantially arched portion in the cross section along the height direction, the respective substantially arched portions may be configured to be upraised from the insulation layer 15; that is, the arched portion of the upper shield layer 16 is provided to be upwardly arched (convex like) and the arched portion of the lower shield layer 13 is provided to be downwardly arched (convex like) as shown in FIG. 14A. The configuration described herein is favorable when its manufacturing process is taken into consideration.

Figure 14B:
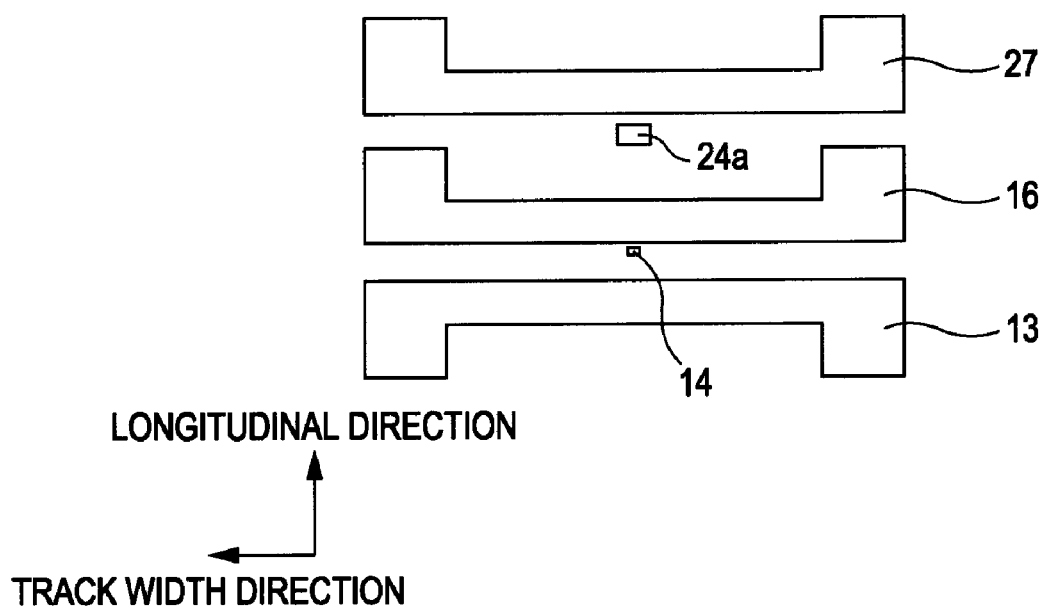

Such an arched portion described above is provided on the return yoke layer 27 in addition to the lower shield layer 13 and upper shield layer 16. In this embodiment, the lower shield layer 13, upper shield layer 16 and return yoke layer 27 may be configured as shown in FIGS. 14A and 14B. That is, the arched portion of the lower shield layer 13 is provided so as to downwardly protrude (convex like), the arched portion of the upper shield layer 16 is provided so as to upwardly protrude (convex like) and the arched portion of the return yoke layer 27 is provided so as to upwardly protrude (convex like). It becomes possible to more effectively keep the Edge Write magnetic field in a low level and improve the external magnetic field resistance, as well as to suppress the PTP phenomenon, by providing an arched portion on the return yoke layer as described above. Incidentally, the configurations shown in FIGS. 11A, 11B, 12A, 12B, and 13A to 13C are applicable to the arched portion of the return yoke layer 27.

A demagnetizing field of the shield layers, which are thin magnetic films, make it is possible to keep an Edge Write magnetic field in a low level and improve external magnetic field resistance with use of a demagnetizing field of the shield layers having substantially arched portions.

The demagnetizing field (Hd) is a magnetic field that is generated by a magnetic pole in a direction opposite the magnetizing direction in a magnetic body, concurrently when the magnetic body being magnetized. In general, demagnetizing field coefficients have the following relationship in an orthogonal coordinate system:

$$N_x + N_y + N_z = 1$$

When a magnetic body is a film having a thickness of approximately zero, the respective demagnetizing field coefficients of the magnetic body can be considered so that Nx and Ny are zero and Nz is 1. Now, it is taken into account that an external magnetic field is applied to such a magnetic body. When an external magnetic field is applied in the direction along an axis easily magnetized, as shown in FIG. 7A, it is thought that the magnetic body is easily magnetized and the generated magnetic field becomes larger; on the other hand, when an external magnetic field is applied in the direction along an axis not easily magnetized, as shown in FIG. 7B, it is thought that the magnetic body is not easily magnetized and the generated magnetic field becomes smaller.

Figure 15:
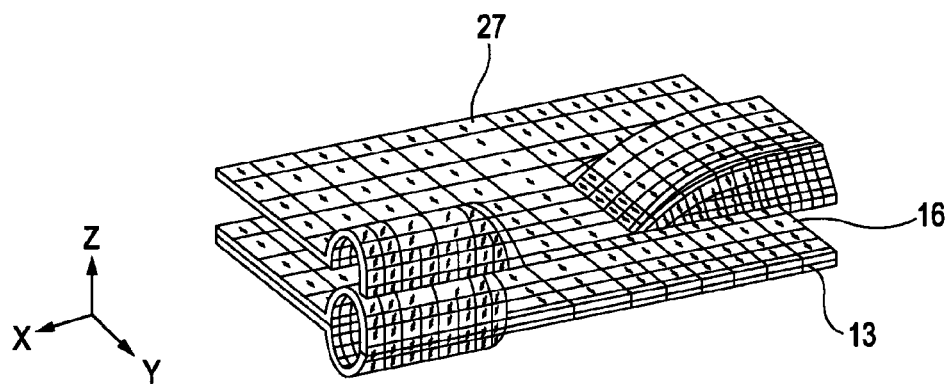
FIG. 15 is a schematic view showing directions of magnetization in the upper shield layer, lower shield layer and return yoke layer respectively having arched portions.

If this way of thinking is applied to the shield layers 13, 16 and return yoke layer 27 of a perpendicular magnetic recording/reproducing head, in the shield layers 13, 16 and return yoke layer 27, since the shield layers 13, 16 and return yoke layer 27 are thin films, magnetization of each of the magnetic bodies concentrates toward the edge of the thin film when being applied with an external magnetic field. For this reason, substantially arched portions are respectively provided for the shield layers and return yoke layer so that there exists a direction not easily magnetized in each of the thin film magnetic bodies. As shown in FIG. 15, the magnetic field component of each layer in the height direction is thereby reduced and the Edge Write magnetic field becomes being kept in a low level, by which the external magnetic field resistance is improved. From this point of view, the cross-sectional shape of the arched portion in the height direction (Y-direction) is not limited, as long as the shape allows a direction not easily magnetized to exist in the thin film magnetic body.

Next, a manufacturing method of a perpendicular magnetic recording/reproducing head having such shield layers will be described. There a first resist layer is formed on a coil insulation substrate layer and a gap layer including upper coil pieces, a second resist layer is formed in the area where arched portions are formed, and a return yoke layer is formed on the second resist layer by applying plating. The return yoke layer may be configured in an arched shape along the second resist layer.

Figure 16A:
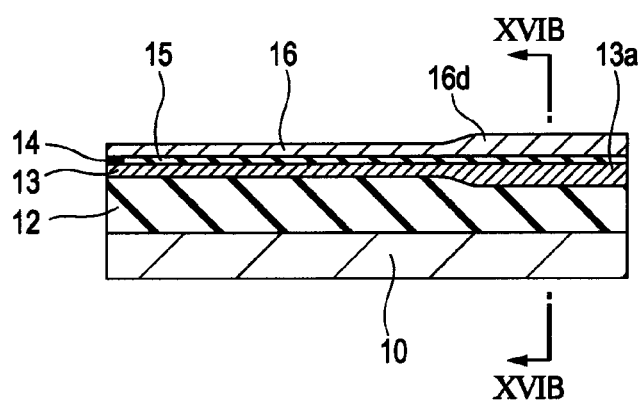
FIGS. 16A and 16B are schematic views for illustrating a manufacturing method for the shield layer section of a perpendicular magnetic reproducing head according to embodiments of the present invention.
Figure 16B:
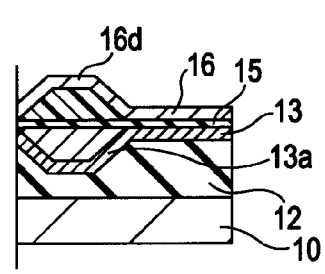

FIGS. 16A and 16B are schematic views showing the shield layer section of a perpendicular magnetic recording/reproducing head according to embodiments of the present invention. FIG. 16A shows a view as seen from the medium-facing surface and FIG. 16B shows the cross-sectional view taken along the line XVIB-XVIB. FIGS. 17A to 17I are schematic views for illustrating a manufacturing method for the shield layer section of a perpendicular magnetic recording/reproducing head according to the present invention. The broken line in FIGS. 17B to 17I indicates the position of the medium-facing surface. The respective layers may be formed under the conditions normally applied.

As shown in FIGS. 16A and 16B, in the shield layer section, a non-magnetic insulation layer 12 is formed on a slider 10, a lower shield layer 13 having an arched portion is formed on the downside thereof on the non-magnetic insulation layer 12, and an upper shield layer 16 having an arched portion is formed on the upside thereof on the lower shield layer 13 with an intermediary inorganic insulation layer 15 disposed therebetween having a reading element 14.

Figure 17A:
FIGS. 17A to 17I are schematic views for illustrating a manufacturing method for the shield layer section of a perpendicular magnetic reproducing head according to embodiments of the present invention.
Figure 17B:
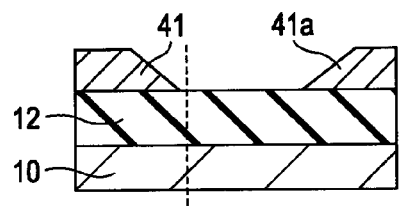
Figure 17C:
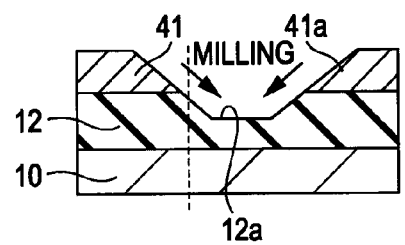

Such a shield layer section is manufactured in the following manner. The non-magnetic insulation layer 12 is first formed on the slider 10 as shown in FIG. 17A, and then a resist film 41 having tapered faces 41a is formed as shown in FIG. 17B. At this time, the resist film 41 is first formed on the non-magnetic insulation layer 12, and then the tapered faces 41a are shaped by applying heat treatment. Next, the non-magnetic insulation layer 12 is applied with a milling process by using the resist film 41 as a mask to form a substantially trapezoidal concave portion 12a as shown in FIG. 17C. After that, the resist film 41 is removed.

Figure 17D:
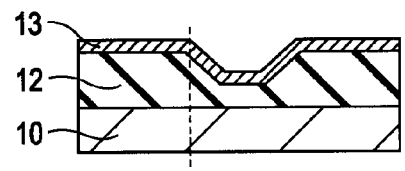
Figure 17E:
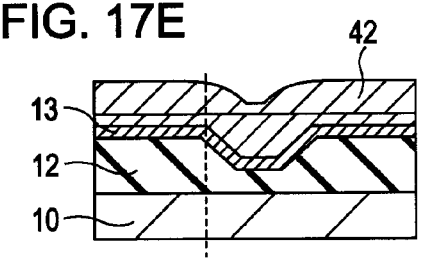
Figure 17F:
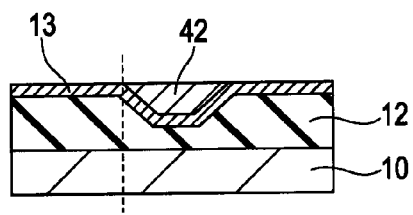

Next, as shown in FIG. 17D, the lower shield layer 13 is formed on the non-magnetic insulation layer 12. At this time, the lower shield layer 13 is formed on the non-magnetic insulation layer 12 by means of plating so as to follow the shape of the concave portion 12a. Then, on the lower shield layer 13, there is formed an insulation layer 42 for filling the concave portion, the insulation layer 42 being composed of an insulation material coated by spattering. As shown in FIG. 17E, this insulation layer 42 is formed to fill the concave portion corresponding to the arched portion 13a of the lower shield layer 13. Because of this, as shown in FIG. 17F, the insulation layer 42 is flattened by CMP (Chemical Mechanical Polishing) until the lower shield layer 13 being exposed; thereby, the insulation layer 42 is embedded into the concave portion of the lower shield layer.

Figure 17G:
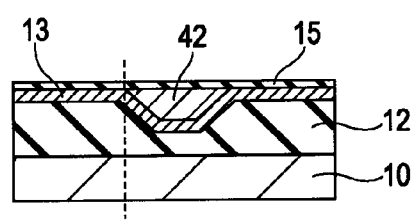

As shown in FIG. 17G, an inorganic insulation layer 15 is formed on the lower shield layer 13 and insulation layer 42, which together with the insulation layer 42 act as a lead gap. At this time, the inorganic insulation layer 15 is composed of an insulation material coated by spattering.

Figure 17H:
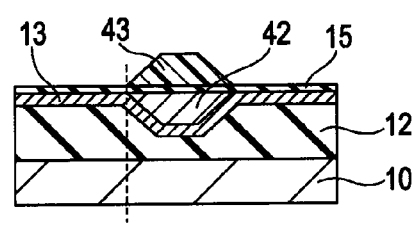

As the next step, a resist layer 43 provided for forming an arched portion 16d of the upper shield layer 16 is formed on the inorganic insulation layer 15 as shown in FIG. 17H; wherein the convex-shaped resist layer 43 is formed in a manner such that the inorganic insulation layer 15 is covered with a resist material, exposed to light through a mask having a closed portion at the area where the resist is formed, and further developed. The cross-sectional shape of the arched portion in the height direction can be changed by changing post-bake conditions for the resist layer 43. For example, a substantially semi-circular cross-sectional shape can be obtained with a relatively higher post-bake temperature, or a substantially trapezoidal cross-sectional shape can be obtained by a relatively lower post-bake temperature.

Figure 17I:
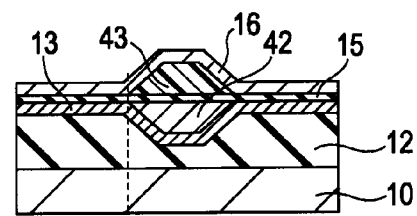

Then, as shown in FIG. 17I, the upper shield layer 16 is formed on the non-magnetic insulation layer 15 and resist layer 43 by means of plating so as to follow the convex shape of the resist layer 43. The upper shield layer 16 and lower shield layer 13 are thus provided with an arched portion respectively, and the configuration is thus materialized that the respective arched portions protrude from the non-magnetic insulation layer 15.

In this method, there can be manufactured the shield layer section having the upper shield layer 16 and lower shield layer 13 respectively including an arched portion. This perpendicular magnetic recording/reproducing head has arched portions that are exposed at the medium-facing surface as known from FIG. 17I. The arched portion has a state such that an external magnetic field is applied in the direction along an axis not easily magnetized. Therefore, the magnetic body is not easily magnetized and the generated magnetic field is small. Accordingly, even if the respective shield layers are relatively thinner, it becomes possible to keep their Edge Write magnetic field in a low level and improve the external magnetic field resistance.

Although substantially semi-circular arched portions located so as to be exposed at the medium-facing surface are illustrated in FIGS. 16A, 16B, and 17A to 17I, substantially trapezoidal arched portions exert similar effects and an arched portion located at a position recessed from the medium-facing surface also exerts similar effects. Furthermore, the positioning of an arched portion at a position recessed from the medium-facing surface enables to suppress the protrusion of the arched portion (PTP) from the medium-facing surface.

Next, an exemplary embodiment performed for verifying the effects of the present invention will be described. In this embodiment, the effects were verified by means of static magnetic field simulation; wherein the portion of a perpendicular magnetic recording/reproducing head related with external magnetic field resistance was modeled, and the magnetization status thereof when being applied with an external magnetic field was calculated. Incidentally, the maximum value among the magnetic field component distribution in a height direction, which is generated from each of the upper shield layer and lower shield layer, was taken as the maximum magnetic field strength. The magnetic field component distribution in the height direction was measured at a plane surface positioned in the center of film thickness of the recording magnetic film. The maximum magnetic field strength obtained was that of a magnetic head equipped with a perpendicular magnetic recording/reproducing head including an upper shield layer and lower shield layer respectively having a substantially semi-circular arched portion in a cross section along a height direction, the upper shield layer having its thickness of 1.6 μm and the lower shield layer having its thickness of 1.2 μm. The results are shown in FIG. 18.

For the purpose of comparison, the maximum magnetic field strength of a magnetic head equipped with a perpendicular magnetic recording/reproducing head including an upper shield layer and a lower shield layer not having an arched portion, the upper shield layer having its thickness of 1.6 μm and the lower shield layer having its thickness of 1.2 μm, was obtained as with the above case. The results are also shown in FIG. 9.

Figure 18:
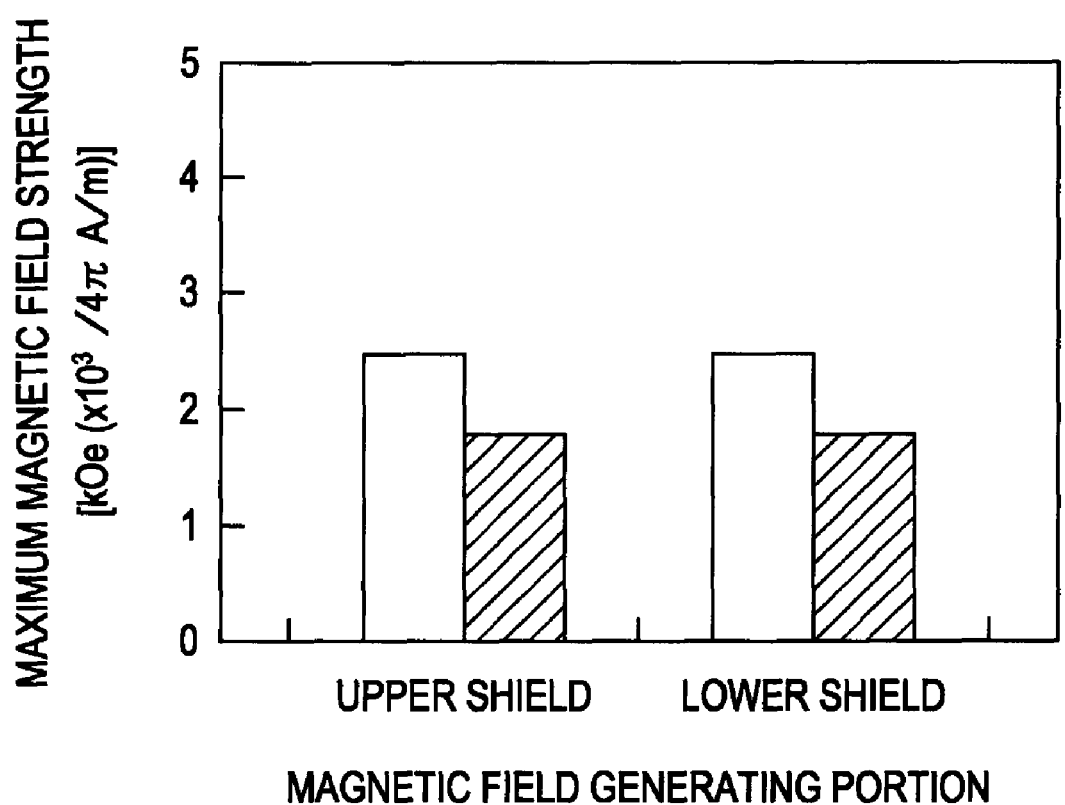
FIG. 18 is a diagram showing characteristics of a perpendicular magnetic reproducing head according to an embodiment of the present invention.

As known from the FIG. 18, the magnetic field strength of the magnetic head equipped with a perpendicular magnetic recording/reproducing head according to the present invention was 2 kOe ($\times 10^3/4\pi$ A/m) or less; namely, the external magnetic field resistance is improved. On the other hand, the magnetic field strength of the magnetic head equipped with a perpendicular magnetic recording/reproducing head having an upper shield layer and a lower shield layer not having an arched portion (hollow bars in FIG. 18) was close to 3 kOe ($\times 10^3/4\pi$ A/m); consequently, Edge Write may arise depending on the coercive force of a recorded medium.

The present invention is not limited to the embodiments described herein and may be practiced by adding various modifications. For example, the numerical values or materials presented in the embodiments described herein are not limited to those, and the processes described in the above embodiments are also not limited to those and may be practiced by changing the order in the processes as appropriate. Moreover, the present invention may be practiced in various other forms not departing from the spirit and scope of the invention.

What is claimed is:

1. A perpendicular magnetic recording/reproducing head comprising:
    a reading element exposed at the facing surface opposite a recording medium;
    a pair of shield layers for shielding the reading element;
    a magnetic layer having a main magnetic pole exposed at a facing surface opposite the recording medium;
    a return yoke layer provided on the magnetic layer with an intermediary non-magnetic layer disposed therebetween; and
    a coil layer for applying a recording magnetic field to the magnetic layer and the return yoke layer,
    wherein at least one of the shield layers among the pair of the shield layers has a shape including a substantially arched portion in its cross section along a height direction normal to the medium facing surface.

2. The perpendicular magnetic recording/reproducing head according to claim 1, wherein each of the shield layers among the pair of the shield layers has a shape including a substantially arched portion in its cross section along a height direction, each of the substantially arched portions being formed so as to protrude from the insulation layer.

3. The perpendicular magnetic recording/reproducing head according to claim 2, wherein the substantially arched portion is located so as to be exposed at the facing surface.

4. The perpendicular magnetic recording/reproducing head according to claim 2, wherein the substantially arched portion is disposed at a position recessed from the facing surface.

* * * * *